United States Patent [19]

Steinmetz et al.

[11] 4,263,615
[45] Apr. 21, 1981

[54] HORIZONTAL DRIVE CIRCUIT FOR VIDEO DISPLAY

[75] Inventors: Richard J. Steinmetz, Elk Grove Village; Gregory J. Beaumont, Arlington Heights, both of Ill.

[73] Assignee: Zenith Radio Corporation, Glenview, Ill.

[21] Appl. No.: 77,517

[22] Filed: Sep. 20, 1979

[51] Int. Cl.³ ............................................... H04N 5/04
[52] U.S. Cl. ..................................... 358/148; 358/158
[58] Field of Search ................................. 358/148, 158

[56] References Cited

U.S. PATENT DOCUMENTS

| | | |
|---|---|---|
| 3,430,067 | 2/1969 | Baum . |
| 3,487,167 | 12/1969 | Riggin et al. . |
| 3,567,857 | 3/1971 | Lynn .................................. 358/158 |
| 3,794,760 | 2/1974 | Moriki . |

*Primary Examiner*—Richard Murray
*Attorney, Agent, or Firm*—Thomas E. Hill

[57] ABSTRACT

Disclosed is a horizontal drive system and method for operating a video display capable of precisely controlling over a wide timing range the interval between the arrival of the leading edge of the input drive pulse and the initiation of the flyback pulse thus permitting the horizontal output to the video display to be synchronized to a great variety of horizontal drive input signals. The leading edge of the horizontal drive pulse triggers a variable time delay monostable multivibrator, the locked output signal of which is coupled to a precision astable multivibrator. Potentiometer adjustment of the monostable multivibrator provides for adjusting video information position with respect to raster scan while the astable multivibrator acts as the oscillator in synchronizing horizontal sweep circuitry to the horizontal input drive signal.

7 Claims, 9 Drawing Figures

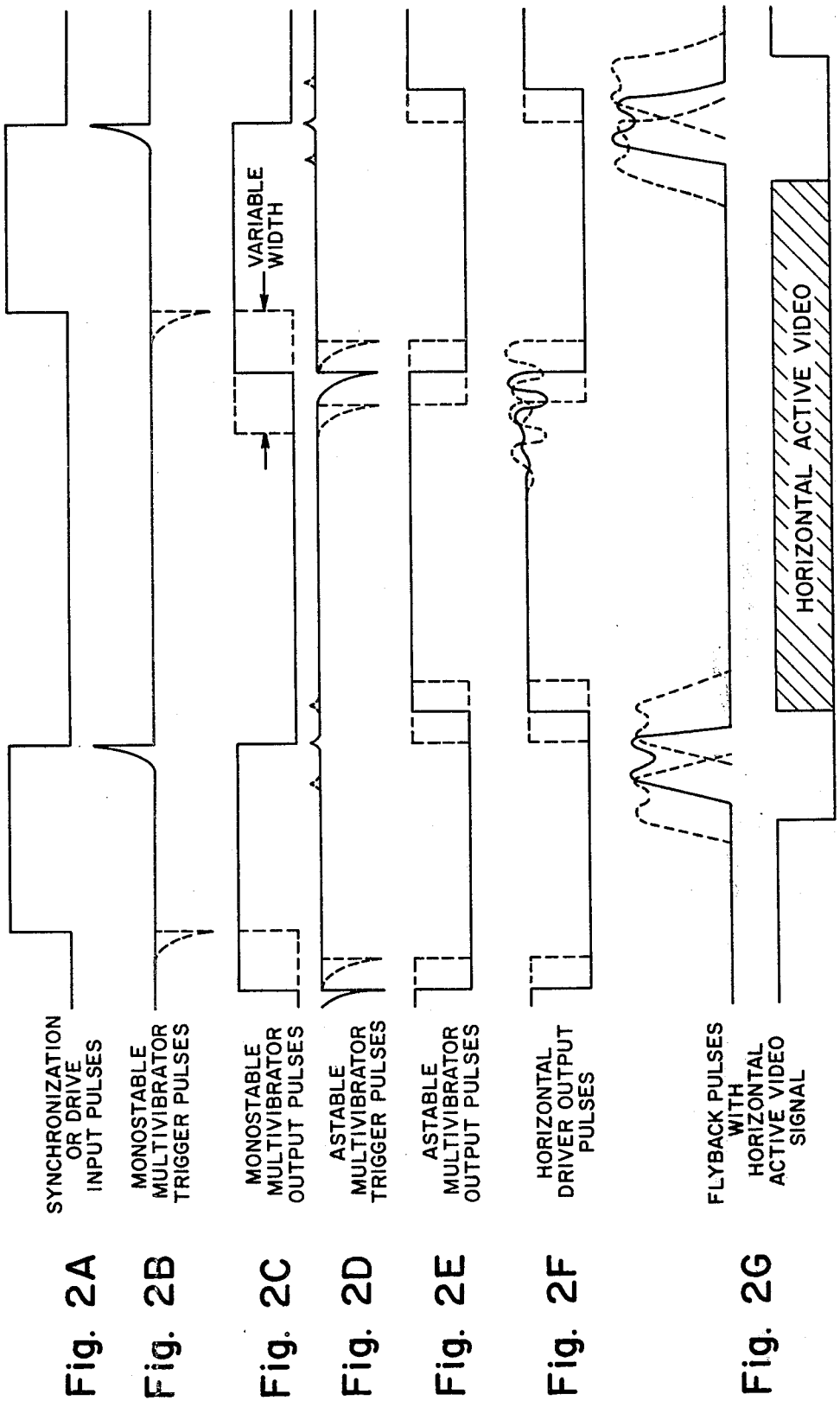

HORIZONTAL DRIVE CIRCUIT FOR VIDEO DISPLAY

CROSS REFERENCE TO RELATED APPLICATIONS

This application is related to, but in no way dependent upon, the following applications all of which are assigned to the assignee of the present application: Ser. No. 075,566, filed Sept. 14, 1979, entitled "Anti-Ringing Circuit for CRT Deflection Yoke" in the name of Gregory J. Beaumont, and Ser. No. 088,729, filed Oct. 26, 1979, entitled "Multivibrator Synchronization System For A Video Display", in the name of Joseph Kadlec.

BACKGROUND OF THE INVENTION

This invention concerns an improved system and method for synchronizing the horizontal sweep circuitry of a video display with a horizontal drive signal.

In general, video information is displayed by a television receiver on a raster which is scanned horizontally at a first rate, and scanned vertically at a second, generally slower rate. The video input information is presented as amplitude-modulated synchronizing pulses by which the raster scanning of the television receiver is synchronized with the information to be viewed. For proper picture framing, it is required that the frequency and phase of oscillation produced by the horizontal sweep system be completely synchronized with those of the horizontal synchronizing signal transmitted from the broadcast station. The synchronization requirements of television receivers are eased somewhat by the standardization of television waves in which the frequencies of the horizontal and vertical synchronizing signals substantially satisfy a predetermined relationship.

This standardization of synchronizing signal relationships has significantly reduced operating requirements of television receivers in this area. The most common approach to signal synchronization in television receivers utilizes a phase locked loop in which a phase detector has horizontal rate synchronizing pulses applied to one input and ramp signals related to the horizontal deflection applied to the other input. The phase detector responds to these inputs and produces control pulses which are filtered and used to control a horizontal-rate oscillator at a frequency which is an average of the incoming synchronizing signals. The horizontal oscillator in turn drives the horizontal deflection generator producing recurrent trace pulses which are integrated to produce the recurrent ramp or sawtooth signal input to the phase detector. Operating limitations in a phase locked loop system arise, however, when input synchronization signals vary over a large frequency range. This variation of input synchronization signal frequency becomes a critical operating parameter when a video display is used in a non-television type of application. For example, a video display used in a computer terminal or in a data display presentation system may be required to interface with a great variety of input synchronization signals. The typical television receiver not only lacks the flexibility to interface with this great variety of input signals but also is incapable of controlling the presentation to fit a particular performance requirement, e.g., using the periphery of the display's raster to present data of one type and the center of the raster to present data of another type.

Various approaches have been undertaken to make video displays more compatible with a greater variety of input synchronization signals. One such approach is described in U.S. Pat. No. 3,794,760. Described therein is a horizontal synchronizing device for a television receiver utilizing a mechanical resonator formed from piezoelectric ceramic material to drive an oscillator at a frequency equal to the input synchronizing signal. This results in the oscillation frequency being drawn toward the frequency of the input synchronizing signal so as to be in agreement therewith. With the oscillator thus synchronized, the disclosure emphasizes the high synchronization stability of this system due to the inherent stability of the oscillator itself. However, the disclosure fails to point out the inherent performance limitations in this system arising from the use of a mechanical resonator, the stability of which is strongly influenced by such factors as aging, temperature variations, and other operating and environmental factors.

Another approach to improving video display synchronization performance is disclosed in U.S. Pat. No. 3,487,167 which passes the composite horizontal and vertical synchronization pulses but separates out all video signals by means of an amplitude separator. Blanking out vertical sync pulses and gating through horizontal sync pulses to the horizontal sync output gate and blanking out horizontal sync pulses while gating through vertical sync pulses to the vertical sync output gate is accomplished by means of two one-shot multivibrators in series. The multivibrator originally is in a nonoscillating state with a trigger signal required to start the single cycle of operation. While this approach reduces jitter in horizontal synchronization at the beginning of the horizontal and vertical interlaced fields in each frame, it does not significantly increase the range of synchronization signals with which a given video display may operate.

Another approach to video display synchronization with incoming signals is disclosed in U.S. Pat. No. 3,430,067 which is directed toward application in a television receiver. This invention permits the production of the 60 Hz field frequency signal directly from the 15,750 Hz line frequency signal by dividing the latter by a non-integer factor. To divide by the non-integer, 262.5, the preferred embodiment includes a frequency divider that divides by 17 and then by 18 in response to a bi-stable multivibrator. The output of this frequency divider directs a monostable multivibrator and a differentiator to provide a pulse train having a series of equally-spaced pulses which have a frequency equal to the line frequency divided by 17.5. While this approach simplifies and improves synchronization in a television receiver, it is limited to a line frequency input of 15,750 Hz.

The present invention, however, utilizes a combined monostable and astable multivibrator configuration to provide video display synchronization with a great variety of input signals. In addition, the present invention, unlike the previously described approaches, is capable of converting a drive pulse or a synch pulse to a properly phased and timed drive pulse.

OBJECTS OF THE INVENTION

Accordingly, it is an object of the present invention to provide an improved process and system for synchronizing the horizontal line sweep of a video display with a horizontal synchronization or drive input signal.

Another object of the present invention is to provide an improved process and system for precisely adjusting video information position with respect to raster scan on a video display.

BRIEF DESCRIPTION OF THE DRAWINGS

The appended claims set forth those novel features believed characteristic in the invention. However, the invention itself, as well as further objects and advantages thereof, will best be understood by reference to the following detailed description of a preferred embodiment taken in conjunction with the accompanying drawings, in which:

FIGS. 2A through 2G are waveform diagrams useful in explaining the circuit shown in FIG. 1.

DESCRIPTION OF THE PREFERRED EMBODIMENT

Figure 1A:
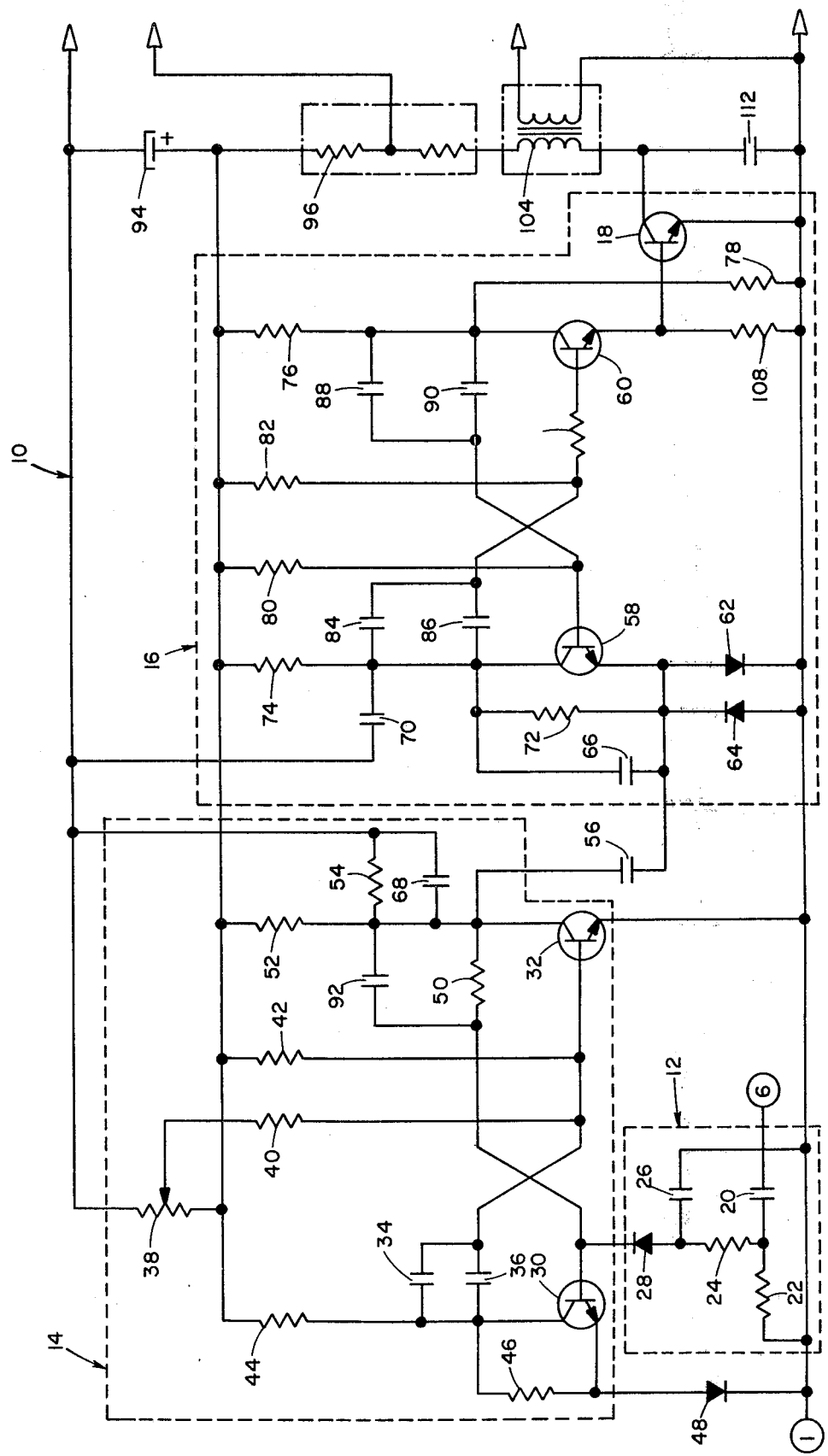
FIGS. 1A and 1B are circuit diagrams showing, in combination, a horizontal synchronization circuit in accordance with the preferred embodiment of the present invention.
Figure 1B:
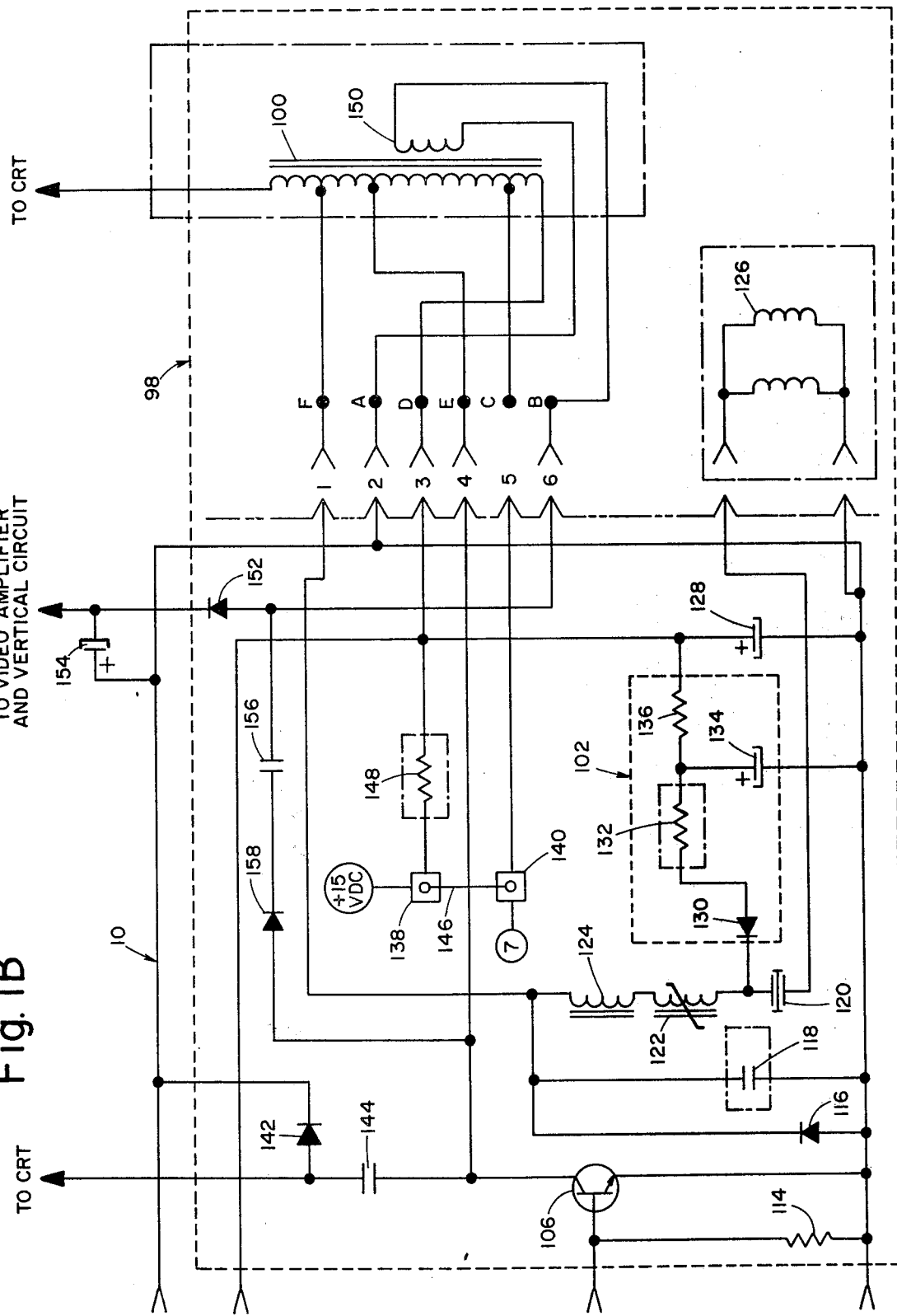

Referring to the circuit diagram of FIG. 1, there is shown a horizontal synchronizing circuit 10 in accordance with the preferred embodiment of the present invention. The primary components of this system are a synchronization processing circuit 12, a monostable multivibrator 14 and an astable multivibrator 16. This circuit receives a horizontal drive input signal via the synchronization processing circuit 12 and processes this signal by means of monostable multivibrator 14 in combination with astable multivibrator 16 in providing an output signal for synchronization and phasing of the horizontal driver 18 with the synchronization input signal.

A horizontal drive or synchronization signal is input to the synchronization processing circuit 12 through printed circuit board pin No. 6 (Horizontal Drive Positive Synchronization). The input signal is differentiated by capacitor 20 and resistor 22 into two pulses, one positive and the other negative. The input signal is then integrated by resistor 24 and capacitor 26 after differentiation in order to remove low energy high frequency pulses which may be circulating in the terminal or other apparatus providing the input signal to pin No. 6. A diode 28 permits only positive-going synchronization pulses to be transmitted by the synchronization processing circuit 12 to the monostable multivibrator 14. The synchronization processing circuit 12 thus, through a series of RC networks, picks off the leading edge of a drive or synchronization pulse and converts it into a pure synchronization pulse of the right shape and magnitude to synchronize the first stage of the horizontal drive circuit 10 consisting of the monostable multivibrator 14.

Transistors 30 and 32 together with capacitors 34 and 36 form the monostable multivibrator which is a one-shot, state-changing device possessing only one stable state which goes from "off" to the "on" position for a specific length of time and then goes back to the "off" position waiting for another synchronization pulse. A diode 28 synchronizes transistors 30 and 32 and provides an input to the monostable multivibrator 14 which initiates a change to the "on" position, or state, for a specific length of time and which is subsequently terminated by the monostable multivibrator itself. With the output of one transistor coupled to the input of the other transistor, transistors 30 and 32 thus coupled form monostable multivibrator 14. Resistors 38 and 40 form a horizontal phasing resistance which is used to vary the length of "on" time of the monostable multivibrator 14. Resistor 38 is a variable resistance potentiometer which while permitting the varying of the length of "on" time of the monostable multivibrator does not introduce erroneous inputs due to environmental factors such as temperature and humidity into the multivibrator's pulse setting. This significantly reduces overall oscillator drift.

Capacitors 20, 34 and 36 together with resistors 40 and 42 form a timing circuit which creates the "on" state of the multivibrator 14 when a synchronization pulse is transmitted by diode 28. Resistors 44 and 46 provide biasing for transistor 30 while diode 48 is capable of handling input signals of reverse, or negative going, synchronization. While the embodiment of the invention described herein is designed to by synced by positive going pulses, this system will work equally well if synchronization is initiated by negative-going pulses. In this case the output of diode 28 would be to the emitter of transistor 30 rather than to the base of transistor 30. Additional elementary modifications would be required to later stages of the horizontal synchronization circuit as described herein to provide for full compatibility with negative-going synchronization pulses.

Resistors 44 and 46 also serve as a voltage divider network across transistor 30 in dividing down the collector voltage so that the emitter-to-base breakdown voltage of transistor 30 of approximately 7 volts is not exceeded. Potentiometer 38 acts as a speed-up capacitor and a switching circuit in speeding up the turn-off of transistor 30 when transistor 32 turns on. The rapid turning on and turning off of these coupled transistors is essential for proper operation of the monostable multivibrator 14. Resistor 50 is connected to the base of transistor 30 and to the collector of transistor 32 and provides a DC current to keep transistor 30 off when transistor 32 is on. Resistors 52 and 54 perform the same function with respect to transistor 32 as resistors 44 and 46 perform for transistor 30, i.e., dividing down the collector voltage so that the transistor's emitter-to-base breakdown voltage is not exceeded. This function is performed by resistors 52 and 54 by controlling the collector voltage of transistor 32.

The output of the monostable multivibrator 14 is transmitted to capacitor 56 which couples the monostable multivibrator to the astable multivibrator 16. This coupling capacitor 56 provides a synchronization pulse to the astable multivibrator 16 which is comprised primarily of transistors 58 and 60. The astable multivibrator 16 is a free-running oscillator which oscillates at whatever frequency it is designed for until it receives an input synchronization signal, at which time it will lock onto the frequency of the input synchronization signal which may be different than its original frequency.

The input synchronization signal to the astable multivibrator 16 is produced by the discharge of capacitor 56 which provides a triggering pulse to the emitter of transistor 58. The combination of diodes 62 and 64 provide for transistor 58 to be triggered only by negative-going pulses imposed on the emitter of transistor 58. Diode 62 allows for ignoring the positive transistions because diode 64 can only come one diode drop above ground with the result that signals above this level are essentially clipped-off and never appear as inputs to the astable multivibrator 16. However, negative-going transitions turn diode 64 off while pulling the emitter of transistor 58 down which is reflected back to the base of that transistor at the same time thus turning transistor 58 on due to the change in the base-emitter voltage. The synchronization, or turn on, of the astable multivibrator 16 is therefore keyed to the trailing, or negative-going, edge of the output pulse of the monostable multivibrator 14. It is in this manner that continuously variable timing delays may be incorporated in the horizontal drive output signal in synchronizing horizontal drive circuitry with the input synchronization signal.

Diode 64 is used not only to permit transistor 58 to be driven by negative-going pulses generated by capacitor 56, but also to limit the energy of the synchronization pulse provided to the astable multivibrator 16. Excessive energy inputs to the astable multivibrator 16 result in 180° phase shift problems, phase jitter, and arcing problems during which the astable multivibrator becomes locked in a shutdown mode with transistors 58 and 60 turned hard on in a saturation mode. With the energy input to the astable multivibrator 16 thus strictly limited, capacitor 66 provides for increased synchronization signal injection into the astable multivibrator 16. Capacitor 66 provides the same synchronization pulse fed through capacitor 56, which goes to the collector of transistor 58, to the base of transistor 60. Thus the synchronization pulse generated by capacitor 56 is supplied to both coupled transistors in the astable multivibrator 16 thus permitting increased input synchronization signal capture by the horizontal synchronization circuit 10.

The details of the interface between the monostable multivibrator 14 and the astable multivibrator 16 are described and claimed in related patent application Ser. No. 088,729, filed Oct. 26, 1979, entitled "Multivibrator Synchronization For A Video Display," in the name of Joseph Kadlec, referred to earlier in the present application.

Capacitor 68 rolls off the leading edge of the monostable multivibrator output pulse while preserving the trailing edge, or synchronization edge, which is controlled by the turn-on of transistor 32. The turn-on of transistor 32 is hard enough so that capacitor 68 is rapidly discharged while the turn-off of transistor 32 has a lesser effect on capacitor 68 because only resistances are left to charge it up. Thus, a smooth action results on the output pulse of the monostable multivibrator 14 on the side not used for synchronization while a sharp pulse edge is incorporated on the monostable multivibrator output on the side used for synchronization.

Capacitor 70 is incorporated to remove spurious noise inputs to the collector of transistor 58. These spurious inputs result in a shifting in the phase delay of the synchronization signal output of the horizontal synchronization circuit 10 which appears on the video display as, for example, improper lining up of the dots of a particular letter presented on the display.

Resistors 72 and 74 provide collector load resistances for transistor 58 and also form a voltage divider which limits the collector voltage of transistor 58. Resistor 72 also provides a DC bias for diode 62 which maintains it in a constant "on" state except when a negative pulse synchronization signal is transmitted by capacitor 56. Resistors 76 and 78 perform the same function with respect to transistor 60 as resistors 72 and 74 perform for transistor 58, namely, acting as collector load resistances and as voltage limiters to establish the proper collector voltage.

Resistors 80 and 82 together with capacitors 84, 86, 88 and 90 provide an RC network which establishes the timing of the astable multivibrator 16. In addition, when the collector voltage of transistor 32 goes low it is transferred across capacitor 92 and is transmitted to capacitors 88 and 90 across which it is also transferred as a negative-going pulse on the base of transistor 58. Capacitor 94 serves as a filter capacitor while resistor 96 acts as a fuse for any short circuits which develop in capacitor 94 or in any other part of the circuit.

The output of transistor 60 provides a re-synchronized, properly timed input waveform to the horizontal driver 18. A synchronization pulse which may have been in an improper position in timing has thus been moved in real time, in so far as the video signal is concerned into proper position. An input drive pulse has thus been converted to a synch pulse of proper synchronization in energizing the horizontal driver 18.

The adaptability of the present invention in terms of accurately synchronizing horizontal drive circuitry to a great variety of input synchronization signals is made possible by the unique combination of the synchronization processing circuit 12, the monostable multivibrator 14, the astable multivibrator 16 and the horizontal driver 18. The horizontal output circuit 98 which processes and transmits the horizontal drive signal from the horizontal driver 18 to the high voltage sweep transformer 100 is of a more conventional design with the exception of the yoke anti-ringing circuit 102 which is described in detail and claimed in patent application Ser. No. 075,566, filed Sept. 14, 1979, entitled "Anti-Ringing Circuit For CRT Deflection Yoke" in the name of Gregory J. Beaumont which is assigned to the assignee of the present application. The anti-ringing circuit 102 is described in general terms later herein.

The horizontal drive transistor 18 acts as an on/off switch. In the "on" position it draws current through the horizontal drive transformer 104 storing energy in this transformer. When the horizontal drive transistor 18 is turned on, the horizontal output transistor 106 which is connected to the output of the horizontal drive transformer 104 is turned off thus providing a positive-going turn-off signal for the horizontal output circuit 98. Thus, when the horizontal output circuit 98 is under a high voltage condition during retrace it is subject to a positive-going turn-off signal which provides positive control of the voltage applied to the base of the horizontal output transistor 106. Resistor 108 provides an "off" resistance to the horizontal driver transistor 18. The horizontal drive transformer 104 acts as a step down impedance-matching transformer in that it converts 50 or 100 milliampere pulses of current into 500 milliampere pulses of current in order to drive the horizontal output transistor 106.

Capacitor 112 acts as a voltage-limiting capacitor such that when the horizontal output transistor 106 turns off, the horizontal drive transformer 104 acts as an inductor resulting in a rapid increase in voltage as the circuit resists the change in current caused by the rapid turn off of the horizontal output transistor 106. Capacitor 112 thus provides a current path which prevents the applied voltage from rising above the breakdown voltage of the horizontal output transistor 106. Resistor 114 provides for the suppression of higher frequency ringing created by the horizontal drive transformer 104.

With the horizontal output transistor 106 "on" during trace time and "off" during retrace time, a pulse waveform is generated on its collector with a pulse width of positive voltage approximately 8 to 9 microseconds in width and of approximately 150 peak volts. During the remainder of the operating cycle, damper diode 116 and limiting capacitor 118 provide for voltage on the collector of the horizontal output transistor 106 which is approximately at ground (~0.2-0.3 volts).

The horizontal output transistor 106 initially draws current from capacitor 120 through the lin (linearity) coil 122, the horizontal width coil 124 and the yoke 126, all of which are in series. The lin coil 122 is biased with a magnet so its inductance changes with the amount and polarity of current passing through it. A positive current reinforces the magnet's effect and lowers the inductance towards a pure air coil configuration without the presence of a ferrite. This produces a sawtooth of current which counteracts the total resistance of the horizontal output circuit 98 including the effect of the yoke's resistance on linearity. This distorted waveform, by compensating for the current drain produced by the yoke 126 of the current produced by the horizontal output transistor 106, generates a perfect pulse waveform delivered to the yoke 126 to produce the required linearity of the yoke input drive pulse.

The variable inductance horizontal width coil 124 permits the voltage delivered to the yoke 126 to be varied, thereby regulating the beam deflection produced by the yoke and the width of the presentation. Damper, or retrace, capacitor 118 limits the peak voltage delivered to the horizontal output transistor 106 when this transistor turns off and a current generated by the yoke, lin, and width inductances delivers a current pulse to this transistor. Capacitor 118 limits this peak voltage so that the collector rating of the horizontal output transistor 106 is not exceeded. In addition, capacitor 118 together with the reflected capacitance of the high voltage sweep transformer 100, the yoke 126, and the lin inductance creates the retrace time. This retrace time determines the magnitude of the voltage delivered to the horizontal output transistor 106.

Yoke coupling capacitor 120, which is designed for operation at high currents and high frequencies, disconnects the yoke to preclude the passage of DC current through it. In addition, capacitor 120 further distorts the perfect waveform delivered to the yoke by generating a parabolic voltage which compensates for the lack of a perfectly spherical picture tube. Capacitor 128 acts as a horizontal B+ voltage filter capacitor which provides filtering, holds the horizontal current within the operating limits of the horizontal output transistor 106 and isolates the horizontal synchronization circuit 10 from the source of input signals to preclude interference between the two systems.

The yoke anti-ringing circuit 102 referred to earlier consists of diode 130, resistor 132, capacitor 134 and resistor 136. This circuit, which as disclosed earlier is the subject of another patent application, operates to eliminate short duration, high frequency ringing of very low impedance produced by residue inductance of the various components in the yoke drive circuit. The problem appears in the yoke and is evidenced by distortion caused by velocity modulation of the electron beam at the start of trace or at the extreme left side of the video display screen. The residue inductance of the lin coil 122, the width coil 124 and the yoke 126 all contribute to this distortion.

Briefly, capacitor 134 stores the B+ voltage entering through resistor 136. This voltage is very small so that capacitor 134 can discharge very quickly at a voltage below that which appears at the junction of diode 130, the lin coil 122 and capacitor 120. This rapid discharge permits resistor 132 to temporarily load the line acting as a noise filter in damping out the high frequency ringing. Diode 130 charges up and permits reistor 132 to be loaded onto the ring circuit for a very short period (3-4 microseconds), and then becomes reversed biased with resistor 132 no longer loading the circuit. The anti-ringing circuit 102 therefore provides for the filtering action of a low resistance (100 ohms) without wasting an excessive amount of yoke power.

Pin 7 is an edge connector on the horizontal synchronization circuit board through which input power is supplied. Connectors 138 and 140 provide additional input means to the horizontal output transistor 106 used to generate the horizontal flyback, or retrace, pulse on a grid of the CRT (not shown). Diode 142 is clamped to capacitor 144 and limits the magnitude of the upper portion of the flyback pulse to 0.6 volts above ground which results in the generation of a negative-going waveform of 150 volts. Capacitor 144 filters the output of the horizontal synchronization circuit 10 to the CRT. A jumper wire 146 connects input pin 7 to the +15 volt power supply to permit either 15 volts through pin 3 or another DC voltage through pin 5 to drive the high voltage sweep transformer 100. Resistor 148 provides a line resistance for the 15 volt DC output line. In order to generate 50 volts DC for the video amplifier and vertical circuit from the pulse winding 150 of the high voltage sweep transformer 100, the input from pin B is rectified by diode 152 and filtered by capacitor 154. Current generated through capacitor 156 and diode 158 is transmitted to the focus control of the CRT.

FIGS. 2A through 2G show the various signals processed and generated by the horizontal synchronization circuit 10. FIG. 2A shows the synchronization or drive input pulses provided through pin 6 to the synchronization processing circuit 12. The individual synchronization or drive input pulses may vary from 4 to 40 microseconds with the synchronization processing circuit responsive to the leading, or right-hand, edge of the individual synchronization or drive input pulses. FIG. 2B shows the monostable multivibrator trigger pulses transmitted by the synchronization processing circuit to the monostable multivibrator 14. These pulses correspond to the positive-going edge of the synchronization or drive input pulses. The negative pulses corresponding to the negative-going edge of the synchronization or drive input pulses which are not transmitted because of diode 28 are shown as dotted pulses in FIG. 2B. The variable width output pulses of the monostable multivibrator which are generated in response to the leading edge of the synchronization or drive input pulses are shown in FIG. 2C. The pulse width of the monostable multivibrator output pulses is variable by means of potentiometer 38. Thus, every positive-going input signal on pin 6 results in the generation of a pre-set pulse of constant width by the monostable multivibrator. The negative-going edge of the monostable multivibrator output pulse results in the generation of astable multivibrator trigger pulses as shown in FIG. 2D. The dotted pulses in FIG. 2D represent the variable position of these trigger pulses as established by potentiometer 38 in setting the pulse width of the monostable multivibrator output pulses. The small positive pulses in FIG. 2D represent those pulses cut off by the diode network consisting of diodes 62 and 64.

The astable multivibrator trigger pulses key the astable multivibrator 16 which, in turn, generates a pulse of constant width as shown in FIG. 2E. The dotted lines in FIG. 2E represent the variable positioning of the astable multivibrator output pulses by means of varying the width of the monostable multivibrator output pulses. The astable multivibrator 16 locks onto the pulse repetition rate of the monostable multivibrator 14 and introduces a fixed delay between the start of synchronization and the initiation of the horizontal flyback pulse. The first part of this delay period is determined by the value set in the monostable multivibrator 14 by means of potentiometer 38 while the second component of this delay period is determined by the inherent, unchanging characteristics of the astable multivibrator 16. As shown in figures in 2E and 2F the astable multivibrator output pulses cause the horizontal driver 18 to generate ouput pulses of fixed duration. The duration of the horizontal driver output pulses equals that of the astable multivibrator output pulses. A certain amount of ripple, or instability, is shown in the initial portion of a horizontal driver output pulse following receipt by the horizontal driver of an astable multivibrator output pulse, as depicted in FIG. 2F.

The flyback pulses shown in FIG. 2G are high voltage pulses applied to the yoke of the CRT which cause the rapid return of the electron beam in a direction opposite to the scanning direction. A flyback pulse is initiated by the negative-going, or left-hand, edge of an astable multivibrator output pulse. Shown in FIG. 2G is the relationship between the flyback pulses imposed on the CRT and the received horizontal active video signal. The CRT's screen is blanked during the flyback pulse in order to make the return trace on the CRT invisible. The dotted pulses shown in FIG. 2G are intended to illustrate the flexibility which the present invention offers in positioning the flyback pulses relative to the received video signal. Ideally the blanking pulses, or flyback pulses, are positioned on either side of the received video signal and are keyed by the leading edge of the individual synchronization or drive input pulses shown in FIG. 2A. During blanking the electron beam inside the CRT is trapped by means of a deflection structure permitting the CRT to be blanked during retrace between sweeps regardless of intensity setting.

There has thus been disclosed a horizontal drive system for a video display capable of synchronizing horizontal drive sweep circuitry with a wide range of synchronization input signal pulse widths. This not only provides greater video display compatability with a variety of synchronization signal inputs but also permits greater flexibility in the way information is presented on the video display. While the present invention has been described as processing horizontal synchronization input signals it will be obvious to one skilled in the art that the present invention could be used in any application which requires the conversion of an input pulse train having a given pulse width and pulse repetition rate to an output pulse train having a different pulse width and pulse repetition rate.

In addition, while particular embodiments of the invention have been shown and described, it will be obvious to those skilled in the art that changes and modifications may be made without departing from the invention in its broader aspects and, therefore, the aim in the appended claims is to cover all such changes and modifications as fall within the true spirit and scope of the invention.

We claim:
1. A system for synchronizing the horizontal sweep signals of a horizontal sweep drive circuit for controlling the scan of an electron beam in a cathode ray tube with input drive signals including horizontal synchronization or drive pulses, said system comprising in combination:
    horizontal synchronization pulse processing means for generating a first series of output pulses, said horizontal synchronization pulse processing means responsive to the leading edge of the horizontal synchronization or drive pulses;
    variable time delay means for generating a second series of output pulses of variable length, said variable time delay means responsive to said first series of output pulses of said horizontal synchronization pulse processing means; and
    fixed time delay means for generating a third series of output pulses of fixed length, said fixed time delay means responsive to the trailing edge of said variable length output pulses and additively coupled to the variable time delay means for producing a series of output drive pulses of fixed time duration and of variable phase with respect to said horizontal synchronization or drive pulses;
    said horizontal sweep drive circuit having an input coupled to said fixed time delay means and responsive to said series of fixed time duration, variable phase output drive pulses for synchronizing the horizontal sweep signals with said horizontal synchronization or drive pulses.
2. A system according to claim 1, wherein said variable time delay means comprises a monostable multivibrator having a single stable oscillation state of variable frequency, said stable state being initiated by the leading edge of said horizontal synchronization or drive pulses.
3. A system according to claim 2, wherein said fixed time delay means comprises an astable multivibrator having a stable state of oscillation of fixed duration, said stable oscillating state being initiated by the trailing edge of said variable length output pulses of said monostable multivibrator.
4. A system according to claim 1, wherein said fixed time duration, variable phase output drive pulses produce a fixed time delay between the arrival of a horizontal synchronization or drive pulse at said pulse processing means and the initiation of the corresponding horizontal sweep signal of approximately one horizontal scan of said electron beam.
5. A system for synchronizing the horizontal sweep signals of a horizontal sweep drive circuit for controlling the scan of an electron beam in a cathode ray tube with input drive signals including a video signal component, horizontal synchronization or drive pulses and horizontal blanking pulses to blank out said cathode ray tube during retrace of the scanning electron beam, said system comprising in combination:
    horizontal synchronization pulse processing means for generating a first series of output pulses, said horizontal synchronization pulse processing means responsive to the leading edge of the horizontal synchronization drive pulses;
    monostable multivibrator means for generating a second series of output pulses of variable length, said monostable multivibrator means being coupled to said horizontal synchronization pulse processing means and having a single stable oscillation state of variable frequency, said stable state being initiated by said first series of output pulses of said horizontal synchronization pulse processing means; and astable multivibrator means for generating a third series of output pulses of fixed length, said astable multivibrator means being responsive to the trailing edge of said variable length output pulses and additively coupled to said monostable multivibrator means for producing a series of output drive pulses of fixed time duration but of variable phase with respect to said horizontal synchronization or drive pulses;

said horizontal sweep drive circuit having an input coupled to said fixed time delay means and responsive to said series of fixed time duration, variable phase output drive pulses for synchronizing the horizontal sweep signals with said horizontal synchronization or drive pulses wherein a fixed time delay between the arrival of a horizontal synchronization or drive pulse at said pulse processing means and the initiation of the corresponding horizontal sweep signal of approximately one horizontal scan of said electron beam is produced.

6. A method for synchronizing the horizontal sweep signals of a horizontal sweep drive circuit for controlling the scan of an electron beam in a cathode ray tube with input drive signals including horizontal synchronization or drive pulses, said method comprising the steps of:

generating a first series of output pulses, said output pulses corresponding to the leading edges of the horizontal synchronization or drive pulses;

generating a second series of output pulses of variable length, said variable length output pulses being initiated by said first series of output pulses;

generating a third series of output pulses of fixed length, said third series of output pulses being initiated by the trailing edge of said variable length output pulses and additively coupled to the variable length output pulses for producing a series of output drive pulses of fixed time duration and of variable phase with respect to said horizontal synchronization or drive pulses; and energizing said horizontal drive circuit with said series of fixed time duration, variable phase output drive pulses thereby synchronizing the horizontal sweep signals with said horizontal synchronization or drive pulses.

7. A method according to claim 6 wherein the step of energizing the horizontal sweep drive circuit further comprises generating a fixed time delay between the arrival of a horizontal synchronization or drive pulse and the initiation of the corresponding horizontal sweep signal of approximately one horizontal scan of said electron beam.

* * * * *